March 15, 1960 F. BÄSSLER 2,928,953

METHOD AND APPARATUS FOR ALIGNING RECORD CARRIERS RELATIVE TO A RECORD SCANNER

Filed Dec. 24, 1956 2 Sheets-Sheet 1

March 15, 1960 F. BÄSSLER 2,928,953

METHOD AND APPARATUS FOR ALIGNING RECORD CARRIERS RELATIVE TO A RECORD SCANNER

Filed Dec. 24, 1956 2 Sheets-Sheet 2

United States Patent Office 2,928,953
Patented Mar. 15, 1960

2,928,953

METHOD AND APPARATUS FOR ALIGNING RECORD CARRIERS RELATIVE TO A RECORD SCANNER

Fritz Bässler, Hannover, Germany

Application December 24, 1956, Serial No. 630,100

11 Claims. (Cl. 250—219)

My invention relates to a method and apparatus for aligning record carriers relative to a displaceable record scanner.

When record carriers are being scanned for registering, evaluating or checking a coded or other record, for performing a sorting or other control operation in discriminating response to such records, it is essential to maintain a very accurate positional relation between the record carrier and the analyzing scanner. Such accurate positioning is difficult particularly when a large number of carriers are to be scanned in rapid succession.

It has become known to perform such aligning operations by automatic devices. The known devices of this type, such as those operating purely mechanically, respond rather slowly, require relatively complicated equipment, and are often not sufficiently accurate for high-speed photoelectric scanning.

It is, therefore, an object of my invention to provide a method and means for precisely securing the proper relative position between record carriers and scanner with the aid of relatively simple equipment suitable for great operating speeds and for the successive processing of a large number of individual record carriers.

To this end, and in accordance with a feature of my invention, I provide a scanner which is displaceable relative to the position or travel path of the record carriers to be scanned, and I control the scanner displacement in dependence upon a signal sensed off the travelling record carrier shortly before it enters into the scanning range.

According to another, more specific feature of my invention, I supply the record carriers sucessively to the displaceable scanner by means of a feeder or conveyor device which defines a given travel path for the record carriers, and I mount a photoelectric control device responsive to a reference characteristic, such as a mark or edge of the record carriers, at a location ahead of the scanner proper so that the photoelectric sensing device, in accordance with its response to the reference characteristic, controls the scanner displacing means to shift the scanner into the accurate scanning position relative to the arriving record carrier.

The particular feeder means for passing the record carriers to the scanner are not essential to the invention. Such feeder means, for instance, may consist of a rotating drum on which the record carriers pass by the scanner, or the feeder device may consist of a conveyor belt or the like. It is further not essential to the invention whether the scanner proper operates photoelectrically, mechanically or in any other manner, although for the purposes of the embodiments described below I prefer using a photoelectric scanner. However, for effecting the desired positional control at the required speed and accuracy, the sensing device responsive to a carrier characteristic ahead of the scanner location must comprise photoelectric or similar radiation-responsive detector means as its sensing members.

The invention is applicable with any suitable record carriers. For instance, the record carriers may consist of paper, cards such as punched cards, boxes, films, sheets and foils of plastic or metal, merchandise, packages, letters of the like. For cooperation with the scanner-position controlling photoelectric device, the record carriers to be used are to have a suitable sensing characteristic, for instance lines, dots, cross marks or the like. The differential value of illumination between a larger area and the record carrier proper, such as the difference in illumination between the wrapping paper and the white address label of a parcel, may also be used as a reference characteristic. The reference mark or characteristic is sensed by photocells of the position control equipment such as photoelectric tubes, photo-transistors or other radiation-responsive electric devices. Preferably, the current or voltage produced by the photoelectric sensing members is amplified by a suitable electronic or other amplifier which supplies the power for an adjusting device that displaces the subsequently operating scanner to the correct scanning position relative to the record carrier.

If the scanner is also photoelectric, then a lateral alignment relative to the record carriers is usually insufficient, it being then also necessary to place the optical device of the scanner into correctly spaced relation to the record carrier depending upon the focal length of the scanner optics. This is particularly important when the indivdual record carriers do not have the same thickness, for instance when the record carriers form part of packages or parcels which are to be sorted in accordance with different code marks or the like. In such cases, preferably after the scanner has been coarsely or approximately adjusted by known mechanical means, the proper scanning position of the analyzing optical-photoelectrical scanner is more precisely adjusted in accordance with the invention to occupy the exact focal distance under control by the photoelectric sensing device responding to a carrier reference characteristic ahead of the scanner.

One way of effecting such a positional control and correction, is to have the photoelectric sensing device issue a control impulse in response to the reference characteristic of the electric carrier, and to apply the impulse for controlling the adjustment of the optical scanner device. The following two operating methods are available for such purposes. One method, referred to as "maximum" method, is to change the scanner positional adjustment until the control current of the photoelectric sensing device reaches a maximum, the correct setting of the focal point of the scanner optics relative to the record carrier being in accordance with this maximum. The other method is the "minimum" method in which the correct adjustment of the focal length of the optical device relative to the record carriers corresponds to a minimum of the controlling current.

Furthermore, the reference characteristic of the record carrier need not necessarily be a mark applied to the carrier just for this purpose. In many cases, for instance a line, mark, edge or area provided for other purposes is also applicable as a reference characteristic for cooperation with the position-controlling sensing device.

While reference is made herein to a displaceable scanner, it should be understood that this term is intended to also refer to scanners in which only a component essential to proper scanning operation is displaceable under control by the photoelectric device. For instance, the photocells and the optics of the photoelectric scanner may be stationarily mounted and the fine adjustment of the optics may be effected by means of a displaceable mirror or prism which is positionally controlled by the photoelectric sensing device. This has the advantage that the relatively heavy optical device and the photocells need not be moved, and that those parts which are to be moved for positional adjustment have only small mass thus requiring a much smaller force for adjusting purposes. This is of advantage particularly in cases where high scanning speed and rapid succession of record carriers is desired.

The foregoing and more specific objects, advantages and features of the invention will be apparent from the embodiments illustrated on the drawing and described in the following. On the drawing.

Figure 1:
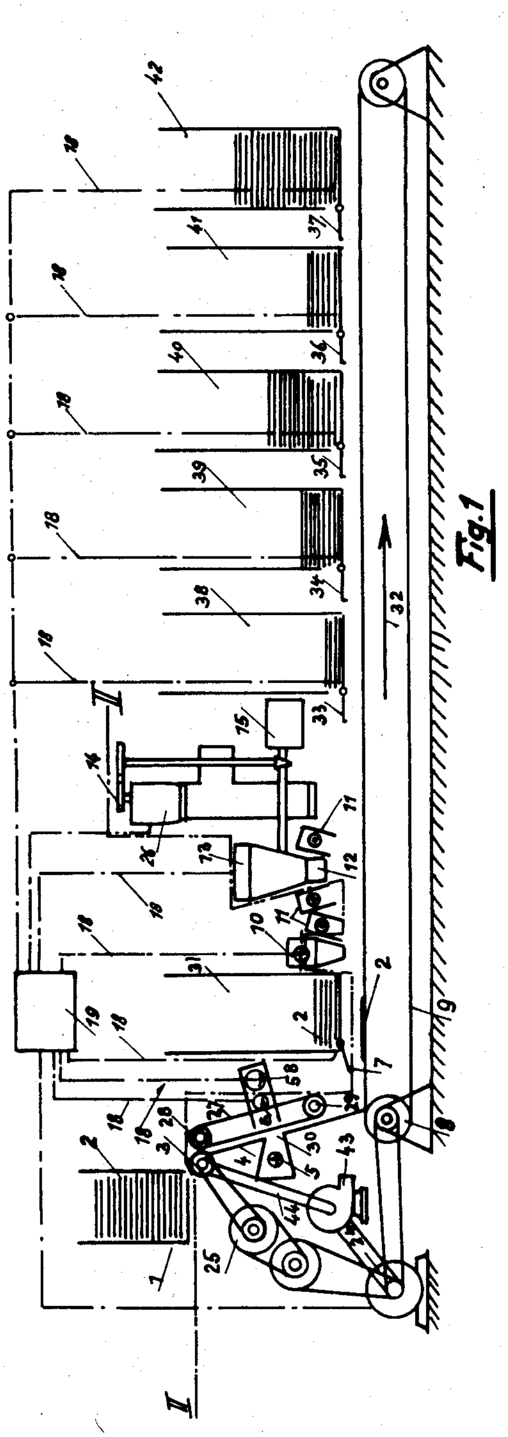
Fig. 1 illustrates diagrammatically a machine equipped according to the invention and designed for the automatic sorting of thin record carriers such as punched cards.
Figure 2:
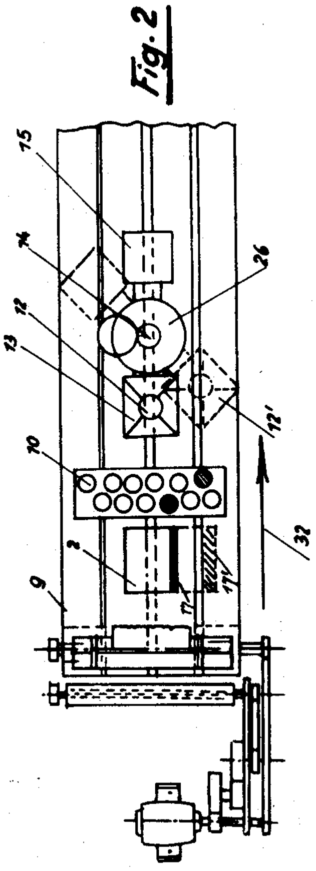
Fig. 2 is a schematic plan view of the same machine at the location denoted by II—II in Fig. 1.

The machine according to Figs. 1 and 2 is provided with a magazine 1 which, when in operation, contains a stack of record carriers or cards 2. A suction roller 3, perforated on a given sector or over its entire periphery, operates to withdraw the lowermost record carrier from magazine 1 when the interior of roller 3 is placed under reduced pressure by means of a vacuum pump or exhauster 43. The interior of roller 3 may be kept permanently under reduced pressure, or the reduced pressure may be controlled to be effective only when a record carrier 2 is to be withdrawn from magazine 1. The record carrier 2 thus entrained by roller 3 passes clockwise (Fig. 1) along the roller until it is stripped off by means of a stripper and guide plate 4 of sheet metal. Thence the record carrier travels forward toward a conveyor belt 9 on at least one narrow drive belt 27 which passes over guide rollers 28, 29 and is spaced from the guide plate 4 a distance corresponding to the thickness of the record carrier. The conveyor belt 9 is driven by an electric motor 24 in the conveying direction indicated by an arrow 32.

The guide plate 4 has at least one opening 30 through which a beam of light from a light source 5 can pass. The light beam passing, partly reduced or obscured, through the record carrier impinges upon at least one photocell 6. This photocell responds to the variation in brilliance of the light beam by a corresponding variation of the electric current flowing through the cell. If two record carriers happen to lie one on top of the other, then the passage of light is substantially reduced. The resulting current variation in photocell 6 is amplified by an electronic amplifying device 19 which actuates a flap 7 so that the record carriers are diverted by the lowered flap 7 from the conveyor belt 9 into a storage compartment 31 and cannot reach the focal scanning area of the analyzing scanner composed of an optical analyzing device 12 and an analyzing group of photocells 13.

When the record carriers 2 being used are transparent, a sufficiently powerful projection lamp may be used as the light source 5. If the record carriers are more or less opaque to visible light, a radiation source must be used, depending upon the particular character of the record-carrier material, which transmits shortwave radiation of greater penetrating power, for example electron radiation.

The photoelectric checking device just described, serves also for detecting the correct lateral position of the record carrier 2 on the belt 9 by responding to any departure from that correct position. If, for instance, the proper reference characteristic of the carrier, such as the marginal guide line 17 (Fig. 2) does not appear, this is detected by another photocell 58 which is likewise mounted opposite the light source 5. That is, when the record carrier passes by the opening 30 in guide plate 4 in such a position that the reference mark 17 does not obscure the photocell 58, this photocell acting through the amplifying device 19, causes lowering of the diverter flap 7 so that the record carrier is passed into the storage compartment 31. Only if the record carrier 2 on belt 27 passes by the checking station of photocells 6 and 58 in the proper position, is flap 7 retained in the illustrated raised position so that the carrier 2 moves from plate 4 on conveyor belt 9 in the direction of the arrow 32.

Mounted between the discharge location at plate 4 and the analyzing scanner 12, 13 is another photocell device 10 which responds to the above-mentioned reference characteristic or mark 17 (Fig. 2) of the record carrier.

The optical portion 12 and the photocell portion 13 of the record scanner are displaceable as a single unit with respect to the travel path defined by the conveyor belt 9, and the positional relation of the scanner relative to the belt is controlled by the photoelectric sensing device 10 so as to be shifted into correct scanning position as the record carrier travels from the photoelectric sensing device 10 toward the scanner. The amplification and correct evaluation of the current output from the photocells 13 of the scanner is effected with the aid of the electronic amplifying device 19 which contains the necessary electronic tubes or other components in suitable circuit connection. For obtaining satisfactory operation of the sensing device 10 as well as of the analyzing scanner 12, 13, the record carrier 2, travelling on belt 9, is illuminated with the required intensity by a light source 11.

Depending upon the result of the analysis effected by the scanner 12, 13, a particular one of a number of diverting flaps 33, 34, 35, 36, 37 is operated under control by the output of the electronic device 19 so that each record carrier 2 is deposited in one of a corresponding number of compartments 38, 39, 40, 41, 42 according to the result of the scanning operation.

To permit the desired scanner displacement, the scanner assembly 12, 13 is mounted for pivotal movement about a vertical axis so that it can assume any position across the conveyor belt 9. The center position is shown by full lines in Fig. 2, one other position being illustrated by broken lines. The vertical axis is at 14. Movement of the scanner assembly in the just-mentioned manner is effected by means of a gear transmission 14, 15 driven by an electric motor 26 which is controlled through the electronic device 19 from the photoelectric sensing device 10.

The operation of the photoelectric sensing device is as follows.

Assume that a record carrier 2, as shown in Fig. 2, is travelling in the direction of arrow 32 toward the photoelectric sensing device 10, and that it is provided with a reference line 17 as shown in solid black. Then, when the record carrier 2 passes on belt 9 beneath the sensing device 10, the one photocell shown solid black will respond with the effect of controlling the motor 26 of the scanner 12, 13 to move the scanner to the full-line position shown in Fig. 2. If the arriving record carrier 2 is in another position so that the reference or marginal mark is located in the position shown hatched at 17', then, in sensing device 10, the photocell also shown hatched will respond thus causing the scanner 12, 13 to be moved to the position shown by broken lines in Fig. 2. The electric connections between the various photoelectric devices with the electronic amplifying and control device 19, and the connections of this device with the flaps and motors controlled thereby are schematically indicated by dot-and-dash lines all denoted by 18.

Figure 3:
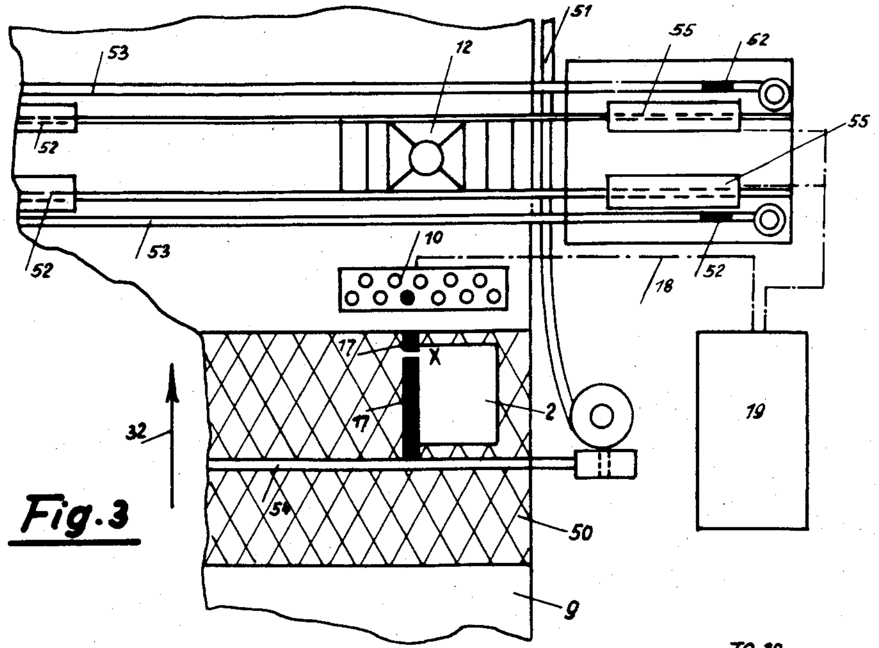
Fig. 3 illustrates a displaceable device for the scanning of records on carriers having different sizes in all three dimensions, such as parcels.
Figure 4:
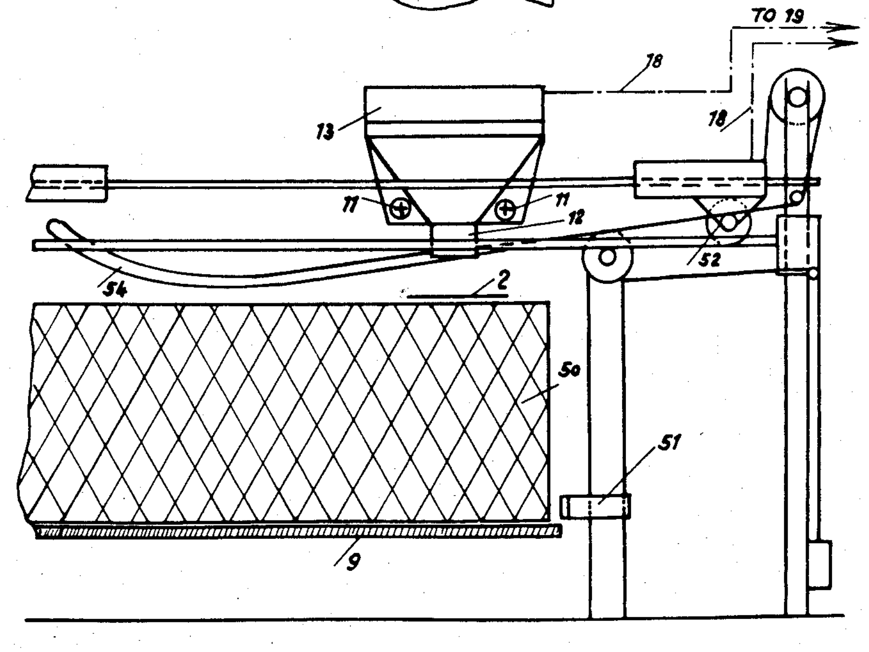
Fig. 4 is a side view of the device shown in Fig. 3.

The embodiment of apparatus according to the invention illustrated in Figs. 3 and 4 is intended for use in cases where the record carriers 2 to be analyzed are located on, or form part of, three dimensional bodies 50 such as parcels, which may vary in shape and size.

As in the machine described above, a conveyor belt 9 is provided for feeding the bodies and record carriers toward the sensing and scanning devices in the direction indicated by an arrow 32. The belt 9 may form part of an assembly line. At least one contact arm 51 operating as a feeler, sweeps over, that is, abuts against, the width of the body. The scanning assembly, comprising the optical portion 12 and a set of analyzing photocells 13, is mounted on a carriage 52 horizontally displaceable along rails 53. The feeler arm 51, during its sweep motion, moves simultaneously with the scanner carriage and thus, when abutting against the body 50, sets the scanner 12, 13 coarsely into approximately correct scanning position. At least one other feeler 54, performs a sweep ascertaining the height of the body 50 on conveyor 9 thus displacing the scanner assembly 12, 13 vertically and setting it coarsely to the approximately correct focal spacing from the record carrier. The necessary fine adjustment is effected in accordance with the invention by means of a photoelectric sensing device 10 which, as in the embodiment already described, is provided with a battery of photocells. The sensing device is mounted at a location corresponding to that of the record carrier 2 relative to the body 50. For instance, when the record carrier, such as an addressing label, is secured to body 50 at a given distance from the right edge, the sensing device 10 is mounted in the vicinity of the right side as shown in Fig. 3. The particular location, however, is not critical because any departure of the position of the label from the edge of the body or parcel 50 is sensed by the device 10 and causes a corresponding positional correction of the scanner assembly 12, 13. The photoelectric device 10 responds to a reference mark 17 in the same manner as described above. The connections between the photoelectric sensing device 10 and the electronic device 19 are such that the particular one photocell that responds in the sensing device 10 energizes a selected one of a group of magnets 55 with the effect of accurately aligning the carriage 52 with the scanner assembly 12, 13 to the correct scanning position.

I claim:

1. Apparatus for positionally controlling discrete record carriers and a record analyzing scanner relative to each other, comprising carrier feed means, a scanner displaceable relative to said feed means, said carrier feed means passing the record carriers successively to the scanner, a photoelectric sensing device responsive to a given carrier characteristic and mounted near said feed means ahead of said scanner, said sensing device comprising a stationed battery of photoelectric elements, and scanner displacing means connected with said device and controlled thereby to vary the scanner position in accordance with said carrier characteristic, whereby said scanner is placed into accurate scanning position as each record carrier travels from said device to said scanner.

2. Register control apparatus for positionally controlling a record scanner relative to discrete record carriers to be scanned, comprising a record-responsive scanner, feed means for passing the discrete record carriers successively to said scanner, said feed means defining a record travel path, said scanner being displaceable relative to said path to proper scanning position relative to the individual records to be scanned, a photoelectric sensing device responsive to a reference characteristic of the record carriers, said sensing device being mounted ahead of said scanner along said path, said sensing device comprising a number of stationary photoelectric elements disposed in a direction transverse to the travel path, and scanner displacing means drivingly joined with said scanner and electrically connected with said control device for varying the scanner position under control by said device.

3. Register control apparatus for positionally controlling a record scanner relative to discrete record carriers to be scanned, comprising a record-responsive scanner having an optical system of a given focal length, feed means defining a travel path for passing the discrete record carriers successively to said scanner optical system, said optical system being displaceable traversely and away from said path for focussing said optical system, a photoelectric sensing device responsive to a reference characteristic of the record carriers, said sensing device being mounted ahead of said scanner along said path, said sensing device comprising a number of stationary photoelectric elements disposed in a direction transverse to the travel path, and drive means mechanically connected with said optical system and electrically connected with said sensing device to be controlled by said device so as to focus said system onto the carrier to be scanned.

4. An apparatus system for scanning record carriers sequentially, comprising a record scanner having an optical system, feed means for passing discrete record carriers successively to said scanner, the feed means defining a travel path for the record carriers, first control means along said travel path for sensing whether a reference characteristic of the record carrier is at least approximately correctly aligned in a direction extending transversely of the travel path, with respect to the correct position for scanning of the carrier record by the scanner, and for giving passage along said path to said record carrier only if so aligned, fine adjustment means for the optical system of the scanner, said latter means including a radiation-responsive sensing device adjacent said travel path in advance of the scanner, and after the first sensing means, to sense the position of a reference characteristic of the record carrier, said latter means further comprising a device controlled by the radiation-responsive device to adjust the optical system to proper scanning position relative to the individual records to be scanned.

5. An apparatus system for scanning record carriers sequentially, comprising a record scanner having an optical system, feed means for passing discrete record carriers successively to said scanner, the feed means defining a travel path for the record carriers, first control means along said travel path for sensing whether a reference characteristic of the record carrier is at least approximately correctly aligned in a direction extending transversely of the travel path, with respect to the correct position for scanning of the carrier record by the scanner, and for giving passage along said path to said record carrier only if so aligned, fine adjustment means for focusing the optical system of the scanner, said fine adjustment means including a radiation-responsive sensing device adjacent said travel path in advance of the scanner, and after the first sensing means, to sense the position of a reference characteristic of the record carrier, said radiation-responsive sensing device comprising a stationary group of photocells extending in said direction transversely of the travel path, said fine adjustment means further comprising a device controlled by the radiation-responsive device to adjust the optical system to proper scanning position relative to the individual records to be scanned.

6. An apparatus system for scanning record carriers sequentially, comprising a record scanner having an optical system, feed means for passing discrete record carriers successively to said scanner, the feed means defining a travel path for the record carriers, means along said travel path for sensing whether a reference characteristic of the record carrier is at least approximately correctly aligned in a direction extending transversely of the travel path, with respect to the correct position for scanning of the carrier record by the scanner, means responsive to the sensing means to obtain an at least approximately correct transverse relative alignment of the record carrier and the optical system, for scanning by the scanner, fine adjustment means for the optical system of the scanner, said fine adjustment means comprising a radiation-responsive sensing device along said travel path in advance of the scanner to sense the position of a reference characteristic of the record carrier, and a device controlled by the radiation-responsive device to adjust the optical system to proper scanning position relative to the individual records to be scanned.

7. An apparatus system for scanning record carriers sequentially, comprising a record scanner having an optical system, feed means for passing discrete record carriers successively to said scanner, the feed means defining a travel path for the record carriers, means along said travel path for sensing whether a reference characteristic of the record carrier is at least approximately correctly aligned in a direction extending transversely of the travel path with respect to the correct position for scanning of the carrier record by the scanner, means responsive to the sensing means to obtain an at least approximately correct transverse relative alignment of the record carrier and the optical system, for scanning by the scanner, fine adjustment means for the optical system of the scanner, said latter means comprising a radiation-responsive sensing device along said travel path in advance of the scanner, and after the first sensing means, to sense the position of a reference characteristic of the record carrier, and a device controlled by the radiation-responsive device to adjust the optical system to proper scanning position relative to the individual records to be scanned, said radiation-responsive sensing device comprising a stationary group of photocells extending transversely of the travel path.

8. An apparatus system for scanning record carriers sequentially, comprising a record scanner having an optical system, feed means for passing discrete record carriers successively to said scanner, the feed means defining a travel path for the record carriers, first control means along said travel path for sensing whether a reference characteristic of the record carrier is at least approximately correctly aligned in a direction extending transversely of the travel path, with respect to the correct position for scanning of the carrier record by the scanner, and for removing from said travel path record carriers not at least approximately correctly so aligned, fine adjustment means for the optical system of the scanner, said latter means including a radiation-responsive sensing device adjacent said travel path in advance of the scanner, and after the first sensing means, to sense the position of a reference characteristic of the record carrier, said fine adjustment means further comprising a device controlled by the radiation-responsive device to adjust the optical system to proper scanning position relative to the individual records to be scanned, said radiation-responsive sensing device comprising a group of photocells extending in said direction transversely of the travel path.

9. An apparatus system for scanning three-dimensional record carrier bodies sequentially, comprising a record scanner having an optical system, feed means for passing the record carrier bodies successively to said scanner, the feed means defining a travel path for the record carrier bodies, means along said travel path for sensing the position of each record carrier body crosswise of the travel path and with respect to the correct position for scanning by the scanner and for obtaining relative movement of the optical system and the body sufficient to obtain at least approximately correct scanning alignment, fine adjustment means for focusing the optical system of the scanner, said fine adjustment means comprising a radiation-responsive sensing device along said travel path in advance of the scanner to sense the position of a reference characteristic of the record carrier, and a device controlled by the radiation-responsive device to adjust the optical system to proper scanning position relative to the individual records to be scanned.

10. An apparatus system for scanning three-dimensional record carrier bodies sequentially, comprising a record scanner having a positionally adjustable optical means, feed means for passing the bodies successively to said scanner, the feed means defining a travel path for the record carrier bodies, means for sequentially sensing the lateral position of each of the record carrier bodies, crosswise of the travel path, and for adjusting the optical system to obtain at least approximately correct lateral scanning position, second means for sensing the height dimension of the bodies, means controlled by the second sensing means for obtaining a first adjustment of the distance between the optical means and the record on the record body, and a radiation-responsive device comprising a group of stationary photocells adjacent said travel path in advance of the scanner and subsequent to the second sensing means to sense the position of a reference characteristic of the record carrier, and a device controlled by the radiation-responsive device to adjust the optical system to proper scanning position relative to the individual records to be scanned.

11. An apparatus system for scanning three-dimensional record carrier bodies sequentially, comprising a record scanner having a positionally adjustable optical system, feed means for passing the bodies successively to said scanner, the feed means defining a travel path for the record carrier bodies, means for sequentially sensing the lateral position of each of the record carrier bodies, crosswise of the travel path, and for adjusting the optical system to obtain at least approximately correct lateral scanning position, second means for sensing the height dimension of the bodies, means controlled thereby for obtaining a first adjustment of the distance between the optical system and the record on the record body, and a radiation-responsive device comprising a group of stationary photocells adjacent said travel path and extending crosswise of the travel path in advance of the scanner, and subsequent to the second sensing means, to sense the position of a reference characteristic of the record carrier, and a device controlled by the radiation-responsive device to adjust the optical system to proper scanning position relative to the individual records to be scanned.

References Cited in the file of this patent

UNITED STATES PATENTS

| | | |
|---|---|---|
| 2,138,645 | Rey | Nov. 29, 1938 |
| 2,358,051 | Broido | Sept. 12, 1944 |
| 2,393,614 | Curtis | Jan. 29, 1946 |
| 2,489,305 | McLennan | Nov. 29, 1949 |
| 2,603,151 | Bryer et al. | July 15, 1952 |
| 2,612,994 | Woodland | Oct. 7, 1952 |